(12) United States Patent
Cha et al.

(10) Patent No.: US 8,435,685 B2
(45) Date of Patent: May 7, 2013

(54) HYDROGEN GENERATING APPARATUS AND FUEL CELL POWER GENERATION SYSTEM

(75) Inventors: Hye-Yeon Cha, Seongnam-si (KR);
Young-Soo Oh, Seongnam-si (KR);
Jae-Hyuk Jang, Seongnami-si (KR);
Chang-Ryul Jung, Seoul (KR);
Jae-Hyoung Gil, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1129 days.

(21) Appl. No.: 12/213,364

(22) Filed: Jun. 18, 2008

(65) Prior Publication Data
US 2008/0318096 A1    Dec. 25, 2008

(30) Foreign Application Priority Data
Jun. 18, 2007    (KR) .................... 10-2007-0059325

(51) Int. Cl.
*H01M 8/06*    (2006.01)

(52) U.S. Cl.
USPC ........... 429/416; 48/61; 204/157.52; 205/639

(58) Field of Classification Search .......... 429/400–535, 429/416; 48/61; 204/157.52; 205/639
See application file for complete search history.

(56) References Cited

U.S. PATENT DOCUMENTS

| | | | |
|---|---|---|---|
| 7,883,805 B2 * | 2/2011 | Nakai et al. | 429/416 |
| 2003/0194368 A1 * | 10/2003 | Devos et al. | 423/657 |
| 2003/0228505 A1 * | 12/2003 | Tsang | 429/19 |
| 2006/0204799 A1 * | 9/2006 | Ishikawa et al. | 429/19 |
| 2007/0217972 A1 * | 9/2007 | Greenberg et al. | 422/232 |
| 2008/0318103 A1 * | 12/2008 | Tsuji et al. | 429/27 |

FOREIGN PATENT DOCUMENTS

| WO | WO 0208118 A1 * | 1/2002 |
|---|---|---|
| WO | WO 2006040985 A1 * | 4/2006 |
| WO | WO 2006073113 A1 * | 7/2006 |

* cited by examiner

*Primary Examiner* — Basia Ridley
*Assistant Examiner* — Jonathan G Leong (57) ABSTRACT

A hydrogen generating apparatus can include an absorbent layer that absorbs an aqueous solution, a metal membrane deposited on either side of the absorbent layer such that the absorbent layer is interposed between the metal membranes, and a support layer formed on one side of one of the metal membranes that transports hydrogen generated by a reaction between the aqueous solution and the metal membrane. A batch type reaction may thus be implemented between the aqueous solution and the metal membranes, so that the reaction can be controlled to provide an even rate of hydrogen generation. Possible disturbances to the reaction resulting from by-products can be prevented, and since there is no additional equipment required, the volume and weight of the fuel cell power generation system can be reduced, and the extra power consumption by the additional equipment can be avoided.

16 Claims, 9 Drawing Sheets

HYDROGEN GENERATING APPARATUS AND FUEL CELL POWER GENERATION SYSTEM

CROSS-REFERENCE TO RELATED APPLICATIONS

This application claims the benefit of Korean Patent Application No. 10-2007-0059325 filed with the Korean Intellectual Property Office on Jun. 18, 2007, the disclosure of which is incorporated herein by reference in its entirety.

BACKGROUND

1. Technical Field

The present invention relates to a hydrogen generating apparatus, a method of manufacturing the hydrogen generating apparatus, and a fuel cell power generation system.

2. Description of the Related Art

A fuel cell is an apparatus that converts the chemical energies of fuel (hydrogen, LNG, LPG, methanol, etc.) and air directly into electricity and heat, by means of electrochemical reactions. In contrast to conventional power generation techniques, which employ the processes of burning fuel, generating vapor, driving turbines, and driving power generators, the utilization of fuel cells does not entail combustion processes or driving apparatus. As such, the fuel cell is the result of new technology for generating power that offers high efficiency and few environmental problems.

Figure 1:
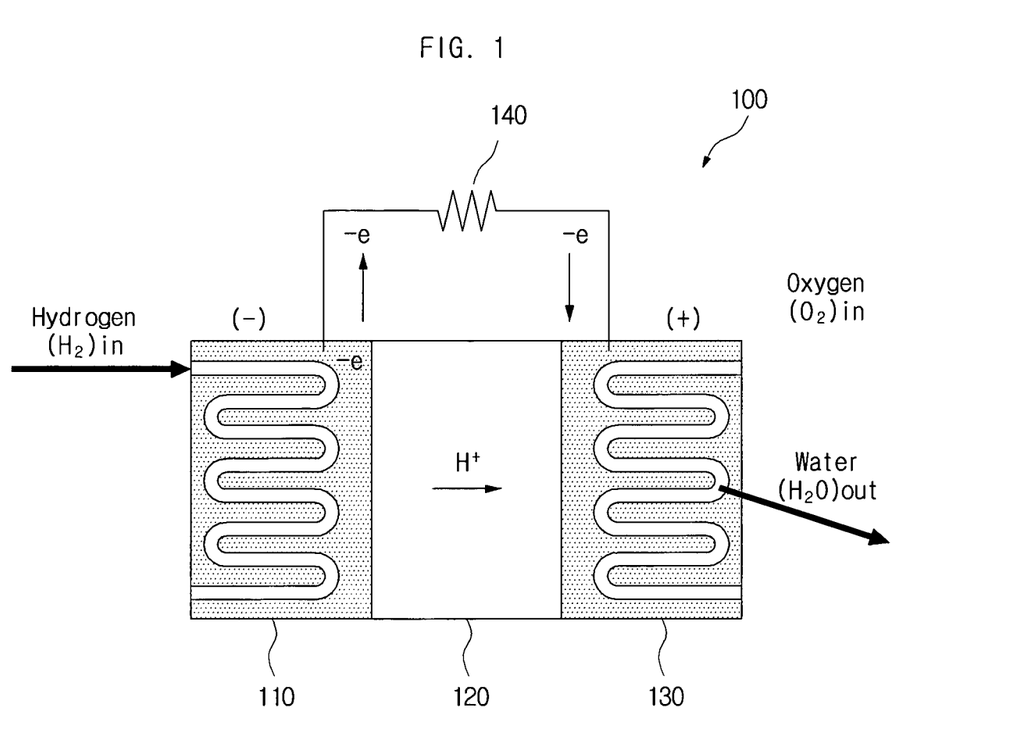
FIG. 1 is a diagram illustrating the operating principle of a fuel cell.

FIG. 1 is a diagram illustrating the operating principle of a fuel cell.

Referring to FIG. 1, a fuel cell 100 may include a fuel electrode 110 as an anode and an air electrode 130 as a cathode. The fuel electrode 110 receives molecular hydrogen ($H_2$), which is dissociated into hydrogen ions ($H^+$) and electrons ($e^-$). The hydrogen ions move past an absorbent layer 120 towards the air electrode 130. This absorbent layer 120 corresponds to an electrolyte layer. The electrons move through an external circuit 140 to generate an electric current. The hydrogen ions and the electrons combine with the oxygen in the air at the air electrode 130 to generate water. The following Reaction Scheme 1 represents the chemical reactions described above.

Fuel Electrode 110: $H_2 \rightarrow 2H^+ + 2e^-$

Air Electrode 130: $\frac{1}{2}O_2 + 2H^+ + 2e^- \rightarrow H_2O$

Overall Reaction: $H_2 + \frac{1}{2}O_2 \rightarrow H_2O$  [Reaction Scheme 1]

In short, the fuel cell can function as a battery, as the electrons dissociated from the fuel electrode 110 generate a current that passes through the external circuit. Such a fuel cell 100 is a pollution-free power source, because it does not produce any polluting emissions such as SOx, NOx, etc., and produces only little amounts of carbon dioxide. Also, the fuel cell may offer several other advantages, such as low noise and little vibration, etc.

In order for the fuel cell 100 to generate electrons at the fuel electrode 110, a hydrogen generating apparatus may be needed, which modifies a regular fuel containing hydrogen atoms into a gas having a high hydrogen content, as required by the fuel cell 100.

That is, examples of fuel cells being researched for application to portable electronic devices include the polymer electrolyte membrane fuel cell (PEMFC), which uses hydrogen as fuel, and the direct liquid fuel cell, such as the direct methanol fuel cell (DMFC), which uses liquid fuel directly. The PEMFC provides a high output density, but requires a separate apparatus for supplying hydrogen. Using a hydrogen storage tank, etc., for supplying the hydrogen can result in a large volume and can require special care in handling and keeping.

Because hydrogen exists as a gas at normal temperature, it has a very low storage efficiency. Using a pressurized tank for storing hydrogen may result in a very large volume for the fuel tank, whereas using an alloy for hydrogen storage may result in a very high mass. As such, the use of a hydrogen storage means may result in an increased size or mass of the overall fuel cell system, and thus may be difficult to utilize in portable electronic equipment.

In order for the fuel cell to suitably accommodate the demands in current portable electronic equipment (cell phones, laptops, etc.) for high-capacity power supply apparatus, the fuel cell needs to provide a small volume and high performance.

The fuel cell may employ a method of generating hydrogen after reforming fuel, such as methanol or formic acid, etc., approved by the ICAO (International Civil Aviation Organization) for boarding on airplanes, or may employ a method of using methanol, ethanol, or formic acid, etc., directly as the fuel.

However, the former case may require a high reforming temperature, and an external source of heat for initial operation. Since the reactions involved are endothermic, a continuous supply of heat may be required. Furthermore, this method may entail a complicated system, and high driving power, and is likely to have impurities (e.g. $CO_2$, CO, etc.) included, besides pure hydrogen. On the other hand, the latter may entail the problem of very low power density, due to the low rate of a chemical reaction at the anode and the cross-over of hydrocarbons through the absorbent layer.

Another possible method may include reacting a metal with water to yield a metal oxide and hydrogen. However, since the reaction occurs only at the surfaces of the metal and the surfaces become coated with the metal oxide, the insides of the metal may remain unreacted, and only small amounts of hydrogen may be produced.

Moreover, the metal will react immediately upon contact with the water, to produce heat and terminate the reaction in a short duration of time. Therefore, in order for the fuel cell to continuously use this method, a flow type reactor may be required, which is able to initiate the reaction sequentially.

In the case of a reaction between water and metal powder, however, a batch type reactor may have to be employed instead of a flow type reactor. One reason for this is that the metal oxide formed as a product of the reaction between the water and metal powder may block the channel of the flow type reactor and thereby obstruct any further supply of reagents.

Therefore, an alternative may be to employ a batch type reactor, but this can entail difficulties in regulating the reaction rate, and can require additional equipment, such as a pump, for regulating the reaction rate.

As such, with a reformer that generates hydrogen by reacting a metal powder with water, it is difficult to control the rate at which hydrogen is generated, and the operation time of a system may become extremely short.

SUMMARY

An aspect of the invention provides a hydrogen generating apparatus, a method of manufacturing the hydrogen generating apparatus, and a fuel cell power generation system, which enable a simplified system, a low reaction temperature, and a stable hydrogen-producing capability. Certain aspects of the invention allow an easier control of the rate of hydrogen generation, and longer operation times.

One aspect of the invention provides a hydrogen generating apparatus, which can include an absorbent layer that absorbs an aqueous solution, a metal membrane deposited on either side of the absorbent layer such that the absorbent layer is interposed between the metal membranes, and a support layer formed on one side of one of the metal membranes that transports hydrogen generated by a reaction between the aqueous solution and the metal membrane.

Here, the absorbent layer can be made of an absorbent polymer material, and the absorbent polymer material can include polyimide.

The metal membrane can be deposited using a thin film deposition method, where the thin film deposition method may include at least one selected from a group consisting of sputtering, evaporation, chemical plating, electroplating, and atomic layer deposition (ALD). The thickness of a metal membrane can be 10 to 20 μm.

The support layer can include at least one of carbon cloth and carbon paper. The absorbent layer, the metal membranes, and the support layer can be implemented in the form of a roll.

Another aspect of the invention provides a fuel cell power generation system, which can include a hydrogen generating apparatus and a fuel cell. The hydrogen generating apparatus can include an absorbent layer that absorbs an aqueous solution, a metal membrane deposited on either side of the absorbent layer such that the absorbent layer is interposed between the metal membranes, and a support layer formed on one side of one of the metal membranes that transports hydrogen generated by a reaction between the aqueous solution and the metal membrane. The fuel cell can be configured to produce an electrical current by receiving the hydrogen generated by the hydrogen generating apparatus and converting the chemical energy of the hydrogen into electrical energy.

Here, the absorbent layer can be made of an absorbent polymer material, and the absorbent polymer material can include polyimide.

The metal membrane can be deposited using a thin film deposition method, where the thin film deposition method may include at least one selected from a group consisting of sputtering, evaporation, chemical plating, electroplating, and atomic layer deposition (ALD). The thickness of a metal membrane can be 10 to 20 μm.

The support layer can include at least one of carbon cloth and carbon paper. The absorbent layer, the metal membranes, and the support layer can be implemented in the form of a roll.

Yet another aspect of the invention provides a method of manufacturing a hydrogen generating apparatus, which can include forming an absorbent layer configured to absorb an aqueous solution, depositing a metal membrane over either side of the absorbent layer such that the absorbent layer is interposed between the metal membranes, and forming a support layer configured to transport hydrogen generated by a reaction between the aqueous solution and the metal membrane over one side of one of the metal membranes.

Here, the absorbent layer can be made of an absorbent polymer material, and the absorbent polymer material can include polyimide.

The metal membrane can be deposited using a thin film deposition method, where the thin film deposition method may include at least one selected from a group consisting of sputtering, evaporation, chemical plating, electroplating, and atomic layer deposition (ALD).

The support layer can include at least one of carbon cloth and carbon paper. After the forming of the support layer, the absorbent layer, the metal membranes, and the support layer can be made to form a roll.

Additional aspects and advantages of the present invention will be set forth in part in the description which follows, and in part will be obvious from the description, or may be learned by practice of the invention.

DETAILED DESCRIPTION

As the invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various elements, such elements must not be limited to the above terms. The above terms are used only to distinguish one element from another. For example, a first element may be referred to as a second element without departing from the scope of rights of the present invention, and likewise a second element may be referred to as a first element. The term "and/or" encompasses both combinations of the plurality of related items disclosed and any one item from among the plurality of related items disclosed.

When an element is mentioned to be "connected to" or "accessing" another element, this may mean that it is directly formed on or stacked on the other element, but it is to be understood that another element may exist in-between. On the other hand, when an element is mentioned to be "directly connected to" or "directly accessing" another element, it is to be understood that there are no other elements in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Certain embodiments of the invention will now be described below in more detail with reference to the accompanying drawings.

Figure 2:
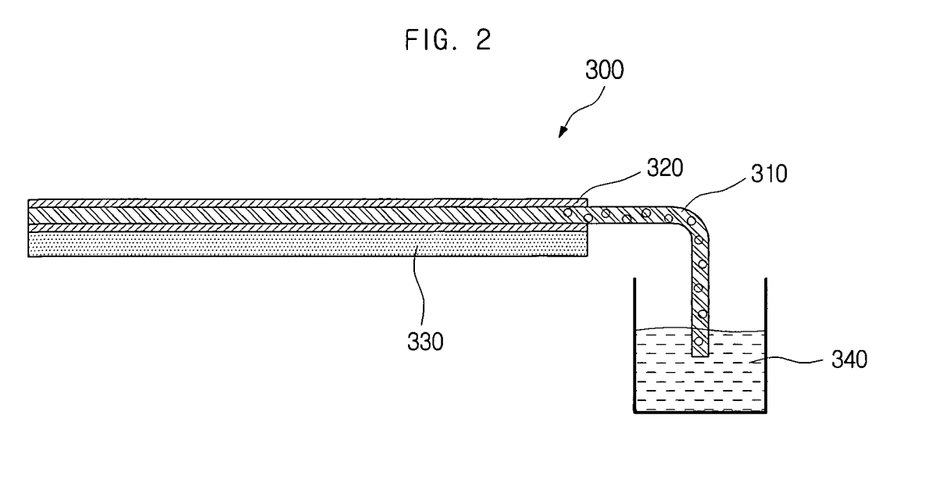
FIG. 2 is a cross sectional view schematically illustrating a hydrogen generating apparatus according to an embodiment of the invention.
Figure 3:
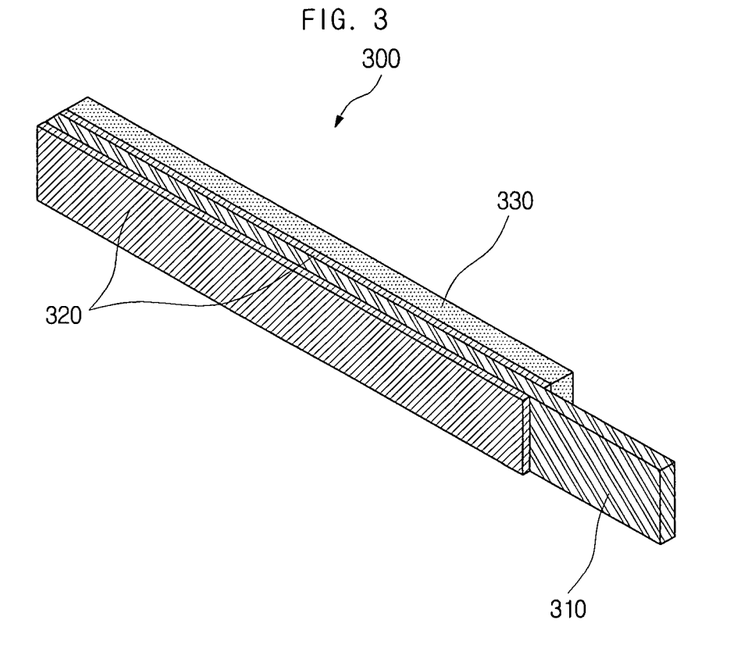
FIG. 3 is a perspective view schematically illustrating a hydrogen generating apparatus according to an embodiment of the invention.

FIG. 2 is a cross sectional view schematically illustrating a hydrogen generating apparatus according to an embodiment of the invention, and FIG. 3 is a perspective view schematically illustrating a hydrogen generating apparatus according to an embodiment of the invention.

As illustrated in the drawings, a hydrogen generating apparatus 300 can include an absorbent layer 310, metal membranes 320, a support layer 330, and an aqueous solution 340.

A hydrogen generating apparatus according to this embodiment can be a reactor for controlling the reaction rate, in employing a method of reacting metal particles with water to generate metal oxide and hydrogen. For better understanding and easier explanation, the term "water" will have the same meaning as "aqueous solution," while "metal particles" will have the same meaning as "metal membranes."

The reaction between aluminum, i.e. as an example of a metal powder, and water can be represented by the following equation.

$$2Al+3H_2O \rightarrow Al_2O_3+3H_2$$

According to the reaction above, it is possible in theory to generate 1.3 L of hydrogen from 1 g of aluminum at room temperature. However, when typical metal powder is made to contact water, the reaction may occur at only the surfaces of the metal, where the surfaces of the metal may be rapidly coated with the metal oxide produced by the reaction between the metal and the water. Thus, the insides of the metal may remain unreacted, and the reaction may be terminated with the actual amount of hydrogen generation being much smaller than the theoretically expected amount.

As such, the greater amount of hydrogen may be generated when the metal particles exist in the smaller sizes. In other words, the greater the surface-area of the metal particles, the higher the efficiency of the reaction.

In this particular embodiment, the absorbent layer 310 can be such that is capable of absorbing the aqueous solution 340, and can be made of an absorbent polymer material such as polyimide. As described above, the absorbent layer 310 may serve as a path of travel for water, in the reaction between aluminum, i.e. a metal powder, and water. The absorbent layer 310 can be implemented as an absorbent film.

A metal membrane 320 can be deposited over either side of the absorbent layer 310, such that the absorbent layer 310 is interposed between the metal membranes 320, and can be deposited using a thin film deposition method. Here, the thin film deposition method can include at least one selected from a group consisting of sputtering, evaporation, chemical plating, electroplating, and atomic layer deposition (ALD).

The metal membranes in this embodiment can be implemented in the form of thin films, because, as described above, greater amounts of hydrogen may be generated when the metal particles exist in smaller sizes, and higher levels of efficiency may be obtained for the reaction when the surface areas of the metal particles are greater.

The thickness of a metal membrane 320 can be several tens of micrometers, for example within a range of 10 to 20 µm. If the thickness of the metal membrane 320 is lower than 10 µm, the amount of hydrogen generation may be decreased, and if the thickness of the metal membrane 320 is greater than 20 µm, unreacted particles may remain inside the metal membranes 320 as the surface of the metal membrane 320 is coated with metal oxide, leading to smaller amounts of hydrogen generation.

Since the reaction will be more efficient for greater surface areas of the metal membranes 320, the metal membranes 320 may not necessarily have to be closely grained.

As illustrated in FIG. 2, the aqueous solution 340 may be absorbed by and transported along the absorbent layer 310, to contact the metal membranes 320 deposited over both sides of the absorbent layer 310 and generate hydrogen. Here, the reaction between the aqueous solution 340 and the metal membranes 320 can be as represented above. The hydrogen generated by the reaction can be discharged through the support layer 330 to the outside of the reactor, and can be transferred to the fuel cell power generation system as fuel for producing electrical energy.

The support layer 330 can be formed over one side of one of the metal membranes 320, and can serve as a path through which the hydrogen generated by the reaction between the aqueous solution 340 and the metal membranes 320 may be transported to the outside.

Therefore, in order that the hydrogen may readily be transported, the support layer 330 can be made of a highly porous material. For example, the support layer 330 can include at least one of carbon cloth and carbon paper.

In the conventional flow type hydrogen generating apparatus, the aqueous solution and the metal may react immediately, so that the reaction may be terminated in a short duration of time while generating heat, making it difficult to control the reaction to obtain an even reaction rate. To resolve this, a hydrogen generating apparatus 300 according to this embodiment can implement a batch type reaction between the aqueous solution 340 and the metal membranes 320, so as to control the reaction rate and obtain an even reaction rate of hydrogen generation.

Therefore, since there is no need for additional BOP (Balance of Plant) equipment for regulating the hydrogen generating reaction, the fuel cell power generation system can be reduced in volume and weight, and the extra power consumption by the BOP equipment can be avoided.

Also, the generation of hydrogen as practiced in this embodiment can be implemented at relatively low temperatures, as opposed to the conventional method of reforming a fuel such as methanol to generate hydrogen, where high reforming temperatures may be required. This can lead to lower costs in generating hydrogen.

Figure 4:
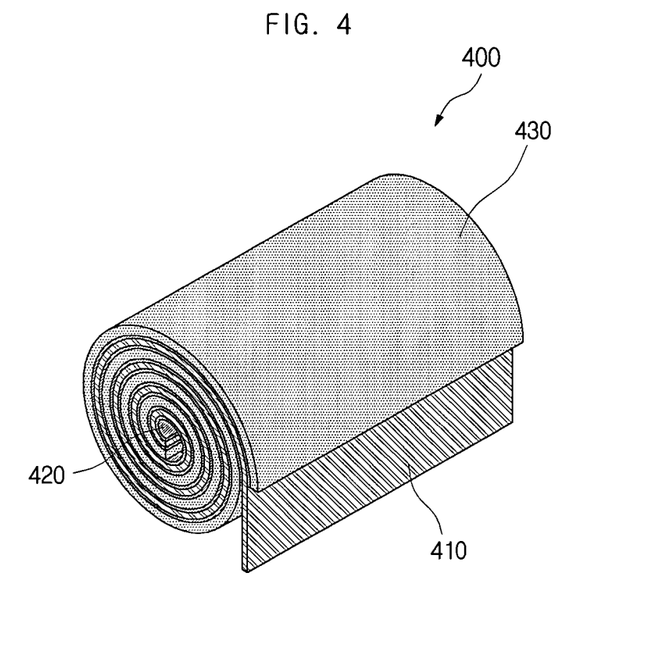
FIG. 4 is a perspective view schematically illustrating a hydrogen generating apparatus according to another embodiment of the invention.

FIG. 4 is a perspective view schematically illustrating a hydrogen generating apparatus according to another embodiment of the invention. As illustrated in the drawing, the hydrogen generating apparatus 400 can include an absorbent layer 410, metal membranes 420, and a support layer 430. The absorbent layer 410, metal membranes 420, and support layer 430 of this embodiment may be substantially the same as those of the embodiment described with reference to FIG. 2 and FIG. 3.

In this embodiment, the absorbent layer 410, the metal membranes 420 deposited over both sides of the absorbent layer 410, and the support layer 430 formed over one side of a metal membrane 420 can be implemented in the form of a roll, to minimize the volume of the hydrogen generating apparatus 400.

When the hydrogen generating apparatus is formed as a roll, if the metal membranes 420 in different layers touch one another, the resulting by-products may block the passage for discharging hydrogen. To resolve this problem, a support layer 430 made of a highly porous material can be formed over one side of a metal membrane 420, so that the generated hydrogen may readily be discharged to the outside of the reactor.

It is to be appreciated that certain aspects of the invention also provide a fuel cell power generation system that includes a fuel cell supplied with the hydrogen generated in the hydrogen generating apparatus described above, and which converts the chemical energy of the hydrogen to electrical energy to produce a direct electrical current.

The hydrogen generating apparatus 400 provided by an embodiment of the invention can be applied to a fuel cell, to obtain an even reaction rate for the hydrogen generating reaction and prevent possible disturbances to the reaction resulting from by-products. As no additional equipment is required for regulating the reaction in the hydrogen generating apparatus 400, the volume and weight of the fuel cell power generation system can be reduced, and the extra power consumption by the additional equipment can be avoided.

Figure 5:
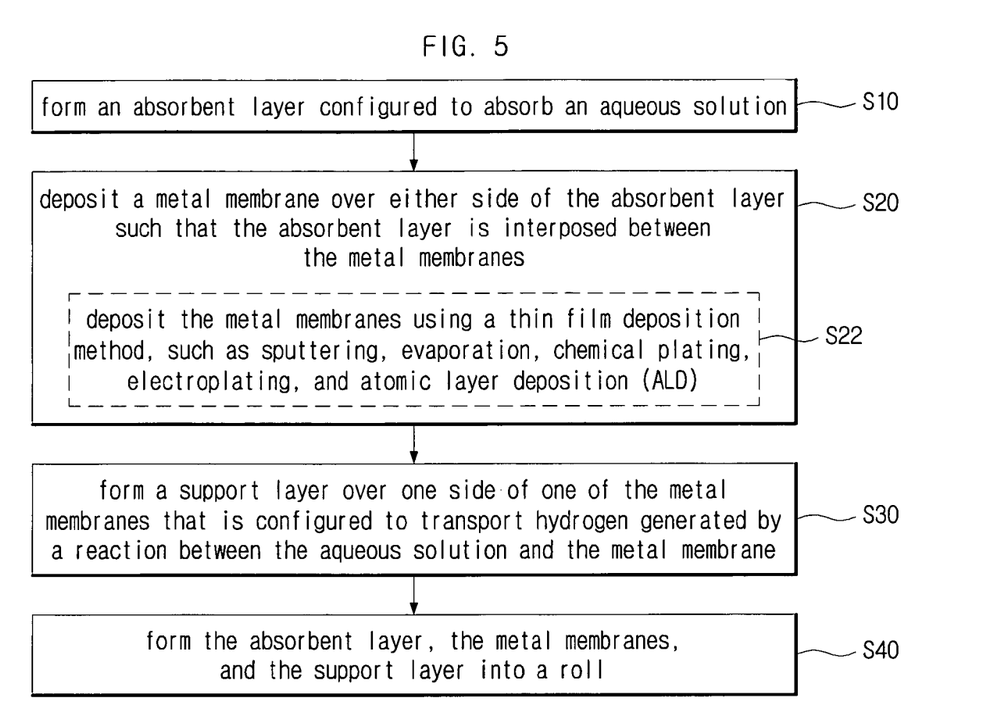
FIG. 5 is a flowchart illustrating a method of manufacturing a hydrogen generating apparatus according to an embodiment of the invention.

FIG. 5 is a flowchart illustrating a method of manufacturing a hydrogen generating apparatus according to an embodiment of the invention, while FIGS. 6A to 6D are cross sectional views representing a flow diagram for a method of manufacturing a hydrogen generating apparatus according to an embodiment of the invention. In FIGS. 6A to 6D, there are illustrated an absorbent layer 310, metal membranes 320, a support layer 330, and an aqueous solution 340.

With this embodiment, the hydrogen generation can be controlled for an even reaction rate, and disturbances to the reaction resulting from by-products can be prevented. Also, as no additional apparatus is required for regulating the reaction, the fuel cell power generation system can be reduced in volume and weight.

Figure 6A:
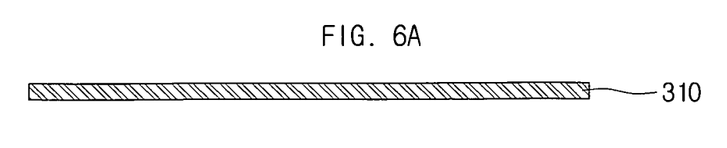
FIG. 6A, FIG. 6B, FIG. 6C, and FIG. 6D are cross sectional views representing a flow diagram for a method of manufacturing a hydrogen generating apparatus according to an embodiment of the invention.

For this, an absorbent layer 310 may first be formed that absorbs the aqueous solution 340 (S10), as illustrated in FIG. 6A. The absorbent layer 310 can be such that is capable of absorbing the aqueous solution 340, and can be made of an absorbent polymer material such as polyimide. The absorbent layer 310 can also be implemented as an absorbent film.

Figure 6B:
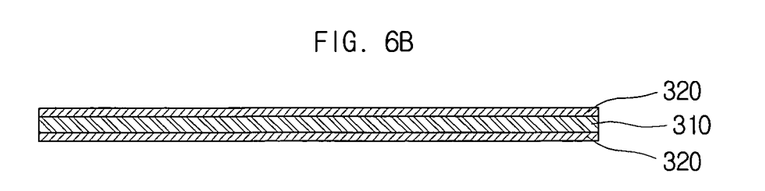

Next, a metal membrane 320 can be deposited over either side of the absorbent layer 310, such that the absorbent layer 310 is interposed between the metal membranes 320 (S20), as illustrated in FIG. 6B. Here, the metal membranes 320 can be deposited using a thin film deposition method, which can include, for example at least one selected from a group consisting of sputtering, evaporation, chemical plating, electroplating, and atomic layer deposition (S22).

The metal membranes 320 can be implemented in the form of thin films to provide larger surface areas, so that the reaction between the metal membranes 320 and the aqueous solution 340 can be performed with a higher efficiency. The thin film metal membranes 320 can be formed to a thickness of 10 to 20 μm.

Figure 6C:
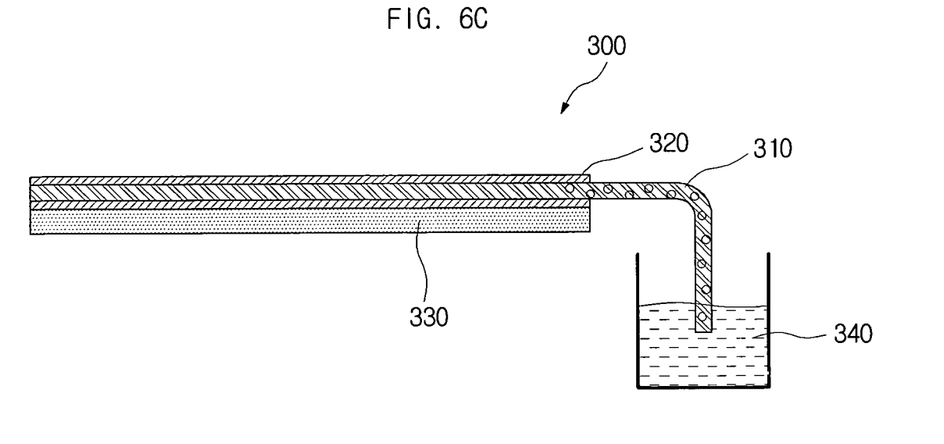

Then, as illustrated in FIG. 6C, a support layer 330 can be formed over one side of one of the metal membranes 320 that serves as a path through which the hydrogen generated by the reaction between the metal membranes 320 and the aqueous solution 340 absorbed through the absorbent layer 310 may be transported to the outside (S30).

Therefore, in order that the hydrogen may readily be transported, the support layer 330 can be made of a highly porous material. For example, the support layer 330 can include at least one of carbon cloth and carbon paper.

Figure 6D:
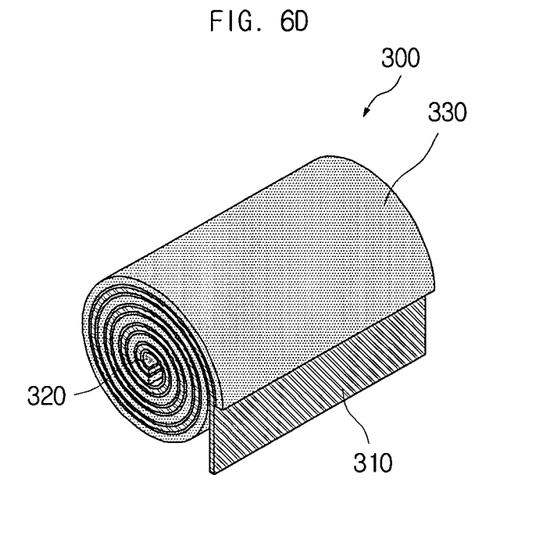

Lastly, as illustrated in FIG. 6D, the absorbent layer 310, the metal membranes 320, and the support layer 330 can be given the form of a roll (S40). In this manner, the volume of the hydrogen generating apparatus can be minimized.

In implementing a hydrogen generating apparatus in the form of a roll, if the metal membranes 320 in different layers touch one another, the resulting by-products may block the passage for discharging hydrogen. To resolve this problem, the support layer 330 made of a highly porous material can be formed over one side of a metal membrane 320, so that the generated hydrogen may readily be discharged to the outside of the reactor.

As described above, a hydrogen generating apparatus according to certain embodiments of the invention can implement a batch type reaction between the aqueous solution and the metal membranes, so that the reaction can be controlled to provide an even rate of hydrogen generation.

Also, possible disturbances to the reaction resulting from by-products can be prevented, and since there is no additional equipment required, the volume and weight of the fuel cell power generation system can be reduced, and the extra power consumption by the additional equipment can be avoided.

The generation of hydrogen can be implemented at relatively low temperatures, as opposed to the conventional method of reforming a fuel such as methanol to generate hydrogen, where high reforming temperatures may be required. This can lead to the advantage of lower cost in generating hydrogen.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention. Many embodiments other than those set forth above can be found in the appended claims.

What is claimed is:

1. A hydrogen generating apparatus comprising:
an absorbent layer configured to absorb an aqueous solution;
a metal membrane deposited on either side of the absorbent layer such that the absorbent layer is interposed between the metal membranes; and
a support layer formed on one side of one of the metal membranes, the support layer configured to transport the hydrogen generated by the reaction between the aqueous solution and the metal membranes,
wherein the metal membrane comprises aluminum and the aqueous solution is water, and
the hydrogen generated according to the following reaction equation:

$$2Al + 3H_2O \rightarrow Al_2O_3 + 3H_2.$$

2. The hydrogen generating apparatus of claim 1, wherein the absorbent layer is made of an absorbent polymer material.

3. The hydrogen generating apparatus of claim 2, wherein the absorbent polymer material is polyimide.

4. The hydrogen generating apparatus of claim 1, wherein the metal membrane is deposited by a thin film deposition method.

5. The hydrogen generating apparatus of claim 4, wherein the thin film deposition method includes at least one selected from a group consisting of sputtering, evaporation, chemical plating, electroplating, and atomic layer deposition (ALD).

6. The hydrogen generating apparatus of claim 1, wherein the metal membrane has a thickness of 10 to 20 μm.

7. The hydrogen generating apparatus of claim 1, wherein the support layer comprises at least one of carbon cloth and carbon paper.

8. The hydrogen generating apparatus of claim 1, wherein the absorbent layer, the metal membranes, and the support layer form a roll.

9. A fuel cell power generation system comprising:
a hydrogen generating apparatus, the hydrogen generating apparatus comprising:
   an absorbent layer configured to absorb an aqueous solution,
   a metal membrane deposited on either side of the absorbent layer such that the absorbent layer is interposed between the metal membranes, and
   a support layer formed on one side of one of the metal membranes, the support layer configured to transport the hydrogen generated by the reaction between the aqueous solution and the metal membranes; and
a fuel cell configured to produce an electrical current by receiving the hydrogen generated by the hydrogen generating apparatus and converting chemical energy of the hydrogen into electrical energy,
wherein the metal membrane comprises aluminum and the aqueous solution is water, and the hydrogen generated according to the following reaction equation:

$$2Al + 3H_2O \rightarrow Al_2O_3 + 3H_2.$$

10. The fuel cell power generation system of claim 9, wherein the absorbent layer is made of an absorbent polymer material.

11. The fuel cell power generation system of claim 10, wherein the absorbent polymer material is polyimide.

12. The fuel cell power generation system of claim 9, wherein the metal membrane is deposited by a thin film deposition method.

13. The fuel cell power generation system of claim 12, wherein the thin film deposition method includes at least one selected from a group consisting of sputtering, evaporation, chemical plating, electroplating, and atomic layer deposition (ALD).

14. The fuel cell power generation system of claim 9, wherein the metal membrane has a thickness of 10 to 20 μm.

15. The fuel cell power generation system of claim 9, wherein the support layer comprises at least one of carbon cloth and carbon paper.

16. The fuel cell power generation system of claim 9, wherein the absorbent layer, the metal membranes, and the support layer form a roll.

* * * * *

UNITED STATES PATENT AND TRADEMARK OFFICE
CERTIFICATE OF CORRECTION

PATENT NO.         : 8,435,685 B2                                   Page 1 of 1
APPLICATION NO.    : 12/213364
DATED              : May 7, 2013
INVENTOR(S)        : Hye-Yeon Cha et al.

It is certified that error appears in the above-identified patent and that said Letters Patent is hereby corrected as shown below:

Title Page, item [75] (Inventors), Line 3, Delete "Seongnami-si" and insert -- Seongnam-si --, therefor.

Signed and Sealed this
Twenty-seventh Day of August, 2013

Teresa Stanek Rea
*Acting Director of the United States Patent and Trademark Office*